Figure 1:
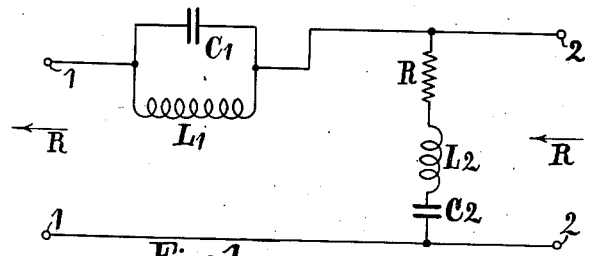

Dec. 6, 1938.     A. D. BLUMLEIN     2,138,996
ELECTRICAL NETWORK
Filed Aug. 12, 1936

INVENTOR
ALAN DOWER BLUMLEIN
BY
ATTORNEY

Patented Dec. 6, 1938

2,138,996

UNITED STATES PATENT OFFICE 2,138,996

ELECTRICAL NETWORK

Alan Dower Blumlein, Ealing, London, England, assignor to Electric & Musical Industries Limited, Hayes, Middlesex, England, a company of Great Britain Application August 12, 1936, Serial No. 95,540
In Great Britain August 12, 1935

20 Claims. (Cl. 178—44)

The present invention relates to the supply of electrical energy to loads which vary over a range of frequency, for example to thermionic valve apparatus, and is particularly concerned with apparatus constituting an improvement in or modification of the invention which forms the subject of U. S. Patent No. 2,035,457.

In the specification of the above-numbered patent, there is described and claimed apparatus for the supply of electrical energy to a varying load, which apparatus comprises a source of direct current and one or more reactive impedance elements either separate from or inherent in the source, means being provided whereby the apparatus as a whole, and including the said means, presents to the load an impedance which is substantially purely resistive over the range of frequency within which energy is to be supplied to the load.

The invention of the above numbered patent is described as applied to direct current sources, such as rectifiers associated with an alternating current generator, which feed a load through a smoothing circuit, the latter comprising essentially series inductances and shunt condensers; the invention is carried into effect by building out the smoothing circuit by means of impedance elements arranged to function as mirror image impedances of the elements of the smoothing circuit, so that the whole apparatus, including the mirror image impedances, simulates a pure resistance.

When the source has a D. C. regulation resistance which is so small as to have no appreciable adverse effect upon the constancy of voltage maintained across the load at very low frequencies of load variation and where there are one or more reactive impedance elements which may cause the regulation impedance to rise to unduly high values, there are provided, according to a feature of the above-numbered patent, means for preventing the regulation impedance from rising to a value which is more than about three times the D. C. regulation resistance.

It has been found, however, that the values of the impedance elements necessary to build out smoothing circuits such as those described in the specification of the above-numbered patent are in many cases undesirably high, and it is an object of the present invention to provide improved or modified apparatus according to the above-numbered patent in which this difficulty is avoided.

In most cases, the smoothing circuit is required to deal more particularly with one frequency or a number of known frequencies; for example, in the case in which the source of direct current is a rectifier, the smoothing circuit is required to prevent current at the ripple frequency or frequencies from reaching the load; the present invention makes use of this fact.

According to the present invention, apparatus adapted for the supply of electrical energy to a load which varies over a range of frequency comprises a source of direct current and a filter including or constituted by a resonant circuit arranged substantially to prevent currents of an undesired frequency from reaching the load, said resonant circuit being made resonant to said undesired frequency, and means are provided whereby said apparatus, viewed from said load, has a substantially purely resistive impedance over a predetermined range of load current and over the range of frequency within which energy is to be supplied to said load.

According to a feature of the present invention, apparatus adapted for the supply of electrical energy to a load which varies over a range of frequency comprises a source of direct current and a filter including or constituted by a resonant circuit arranged substantially to prevent currents of an undesired frequency from reaching the load, said resonant circuit being made resonant to said undesired frequency, and there are provided means including a further circuit which is resonant to said undesired frequency and is so constructed and arranged as to prevent the regulation impedance of said apparatus as a whole from rising, at said undesired frequency and over a predetermined range of load current, to an unduly high value, that is to say, a value exceeding about three times the direct current regulation resistance of said apparatus.

Other features of the invention will appear from the following description and the appended claims.

Figure 2:
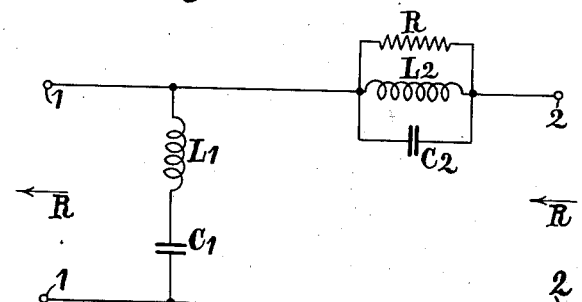
Figure 3:
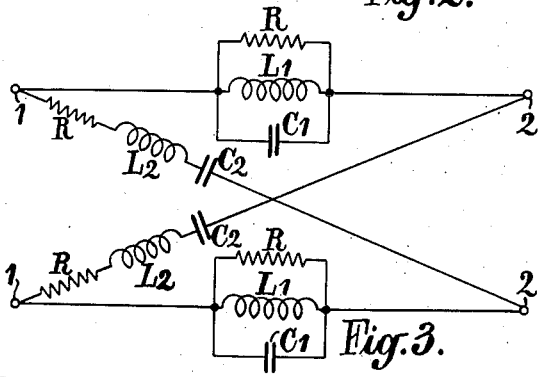
Figure 4:
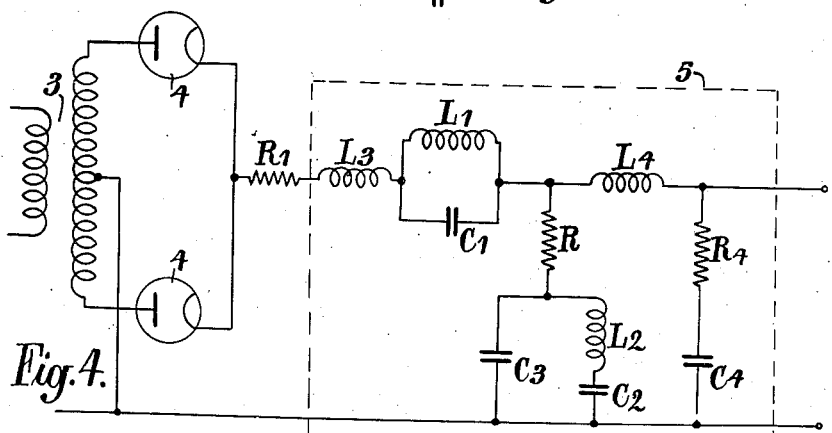

The invention will now be described, by way of example, with reference to the accompanying drawing, in which Figs. 1 and 2 show two forms of filter section which are suitable for use in apparatus according to this invention, Fig. 3 shows a filter section suitable for use in apparatus in which either the source of current or the load is floating, that is to say, is unconnected at any point to earth or a like point of fixed potential, and Fig. 4 shows apparatus according to this invention which includes a full-wave rectifier and a filter comprising circuits resonant to an undesired frequency.

The filter sections shown in Figs. 1 and 2 are suitable for use either alone or in conjunction with additional smoothing means of the kind shown in the specification of the above-numbered patent. The circuit of Fig. 1 comprises a series arm $L_1$, $C_1$ and a shunt branch R, $L_2$, $C_2$, and that of Fig. 2 has a shunt branch $L_1$, $C_1$ followed by series arm $L_2$, $C_2$, R.

The terminals 1 are in both cases connected either to the source, or to the output terminals of a smoothing circuit associated with the source, and the terminals 2 are connected to the load or to a further stage or stages of smoothing; in any case, however, it must be arranged that the impedance to which terminals 1 are connected, looking towards the left, is equal to R, the value of the resistance in the shunt branch; for example, in the case in which the terminals 1 are connected to the source the value of the direct current regulation resistance of the source is made equal to R and, as will be shown later, it may be necessary in some cases artificially to increase the effective regulation resistance in order to obtain the desired relationship.

Both in Figs. 1 and 2 the circuits comprising inductance $L_1$ and condenser $C_1$, and inductance $L_2$ and condenser $C_2$ respectively are made resonant to an undesired frequency, and it is arranged that $$\frac{L_1}{C_2}=\frac{L_2}{C_1}=R^2 \qquad (1)$$

The impedance looking towards the left from terminals 2 is in both cases equal to R.

The bridge-type section shown in Fig. 3 is suitable for use in cases in which the source or the load is floating the relationship between the values of the several components is that given in Equation 1; that is, the same relationship holds as for Figs. 1 and 2.

The attenuation introduced by the filter sections shown in the three figures so far considered is very high at the frequency at which $L_1$ and $C_1$ are resonant, and is dependent on the resistances of these components. Several sections of the kinds shown in Figs. 1 to 3 may be employed in association with the same source, the sections being made to provide their maximum attenuation at the same frequency or at a number of different frequencies, such as a series of ripple frequencies.

Reference will now be made to Fig. 4, in which a full-wave rectifier comprising two hot-cathode mercury vapour rectifiers 4, fed with alternating current from supply mains through mains transformer 3, is arranged to feed direct current to a load (not shown) connected between terminals 2. A complex filter circuit 5 is connected between the rectifiers 4 and terminals 2, and the regulation of the apparatus depends on the regulation of the mains, the characteristics of the mains transformer and the rectifiers 4 and upon the nature of the filter.

The resistance $R_1$ is provided to build out the direct current regulation of the part of the apparatus to the left of the filter 5 to a value equal to the input impedance of the filter; this value is made high (about 100 ohms) so as to avoid the necessity for the use of condensers of very large capacity in the filter.

The first series arm of the filter, comprising inductances $L_1$ and $L_3$, and condenser $C_1$, is required to introduce a large attenuation at all ripple frequencies. Inductance $L_1$ and condenser $C_1$ are chosen to resonate at the main ripple frequency—that is to say, with two well-balanced rectifiers, twice the supply mains frequency—and the inductance $L_3$ is arranged to have a large impedance at the remaining ripple frequencies; it will be observed that on account of the provision of resonant circuit $L_1C_1$ the inductance of $L_3$ can be made less than the value which would be necessary if circuit $L_1C_1$ were omitted, and inductance $L_3$ were required to deal with the whole series of ripple frequencies. It will be understood that the amplitude of the electromotive force at the lowest ripple frequency is greater than the amplitudes of the remaining ripple frequency electromotive forces.

It must be arranged, however, that the capacitive reactance of circuit $L_1C_1$ at the second ripple frequency (which is approximately the second harmonic of the first ripple frequency) is less than the reactance of inductance $L_3$ at this frequency; that is to say, the resonant frequency of $L_3$ and $L_1C_1$ in series must be below the second ripple frequency, and a convenient value for this resonant frequency is 1.25 times the first ripple frequency, or less.

The first shunt branch of the filter, comprising a resistance of value R, inductance $L_2$ and condensers $C_2$ and $C_3$, is arranged to build out the filter to a resistance equal to R; for this purpose the following relationship must be satisfied:

$$\frac{L_1}{C_2}=\frac{L_2}{C_1}=\frac{L_3}{C_3}=R^2$$

A further stage of smoothing comprising series inductance $L_4$ and its mirror image impedances $C_4$ and $R_4$ arranged as a shunt branch, is provided, and it is arranged that $$\frac{L_4}{C_4}=R_4^2, \text{ and } R_4=R$$

so that the whole apparatus, viewed from terminals 2, simulates a pure resistance of value R.

For a mains supply frequency of 500 cycles per second (c. p. s.) giving a first ripple at about 1000 c. p. s., the following values have been found suitable for the various components of the apparatus of Fig. 4:

Inductance $L_1$, 0.1 henry         Condenser $C_1$, 0.25 microfarad
Inductance $L_2$, 0.0025 henry      Condenser $C_2$, 10.0 microfarads
Inductance $L_3$, 0.2 henry         Condenser $C_3$, 20.0 microfarads
Inductance $L_4$, 0.15 henry        Condenser $C_4$, 15.0 microfarads
Resistance R, 100 ohms              Resistance $R_1$, 80 ohms.

With these values and with rectifiers having a D. C. regulation resistance of 20 ohms, it was found that the regulation resistance of the apparatus was constant for load currents of from 0.2 to 1.0 amp., but that for currents of less than 0.2 amp., the regulation increased rapidly. Accordingly, if the load is likely to require steady currents of less than 0.2 amp., it is desirable to connect across the terminals 2 a dead load such as a resistance which will ensure that the current taken never falls below 0.2 amp.

The resonant frequency of circuit $L_1C_1$ may be made slightly higher than the first ripple frequency so as to ensure that the first ripple frequency does not become too close to the resonant frequency of $L_1C_1$ with inductance $L_3$ if the supply mains frequency wanders.

If the leakage impedances between the two halves of the secondary winding and the primary winding of the transformer 3 are small, and if the mains regulation for voltage and frequency is also small, then changes in load current (or changes above the value below which the regulation of the apparatus rises) introduce substantially no changes in the amplitude of the ripple current, and the smoothing obtained is thus constant in spite of variations in the load.

In setting up the apparatus, resistance $R_1$ is not inserted until a preliminary test for D. C. regulation has been carried out; for this test, the whole of filter 5, with the exception if desired of inductance $L_4$ and the shunt branch $R_4$, $C_4$, should be in circuit. From this test, the desired value for $R_1$ can be readily determined. Further, measurements of impedance may be carried out in the neighborhood of a frequency $f$, where $$f = \frac{1}{2\pi\sqrt{L_3 C_3}}$$

in order to ascertain whether allowance should be made for the inductance of the rectifiers in fixing the value of $L_3$; any necessary allowance may be made by increasing $C_3$.

The invention is of course not limited to the arrangements described above by way of example; many modifications of the invention within the scope of the appended claims will occur to those versed in the art.

I claim:

1. An apparatus adapted for the supply of electrical energy to a load which varies over a range of frequency, comprising a source of direct current, and an L-type filter including a resonant circuit in the series arm arranged substantially to prevent currents of an undesirable frequency from reaching the load, a second resonant circuit in the shunt arm of the filter, said resonant circuits being made resonant to the undesired frequency, and means in said series and shunt circuits providing a substantially pure resistive impedance over a predetermined range of load current and over the range of frequency within which energy is to be supplied to said load.

2. Apparatus adapted for the supply of electrical energy to a load which varies over a range of frequency, comprising a source of direct current and a filter including a resonant circuit arranged substantially to prevent currents of an undesired frequency from reaching the load, said resonant circuit being made resonant to said undesired frequency, wherein there are provided means including a further circuit which is resonant to said undesired frequency and is so constructed and arranged as to prevent the regulation impedance of said apparatus as a whole from rising, at said undesired frequency and over a predetermined range of load current to a value exceeding about three times the direct current regulation resistance of said apparatus.

3. Apparatus according to claim 1, wherein said L-type filter impedance network series arm comprises a rejector circuit and the shunt arm comprises an acceptor circuit.

4. Apparatus according to claim 2, wherein said filter comprises an L-type impedance network having a series arm comprising a rejector circuit and a shunt branch comprising an acceptor circuit.

5. Apparatus according to claim 1, wherein a dead load is connected between the output terminals of said filter for the purpose of preventing the current drawn from said source from falling below a predetermined value.

6. Apparatus according to claim 2, wherein a dead load is connected between the output terminals of said filter for the purpose of preventing the current drawn from said source from falling below a predetermined value.

7. Apparatus according to claim 1 wherein said filter includes smoothing means comprising an inductance element connected in series and a circuit comprising a condenser and a serially connected resistance connected in shunt with the inductance elements.

8. Apparatus according to claim 2, wherein said filter includes smoothing means comprising an inductance element connected in series and a circuit comprising a condenser and a serially connected resistance connected in shunt with the inductance elements.

9. Apparatus according to claim 1 wherein an inductance element is connected in series between the direct current source and the first resonant circuit.

10. Apparatus according to claim 2, wherein an inductance element is connected in series with said resonant circuit.

11. An electrical filter comprising an L-section including in the series arm thereof a non-reactive impedance, a positive reactance and a serially connected resonant circuit and including in the shunt arm thereof a non-reactive impedance and a resonant circuit connected serially therewith.

12. An electrical network comprising a first L-type filter including in the series arm thereof a positive reactance and a serially connected resonant circuit and including in the shunt arm a non-reactive impedance and a resonant circuit connected serially therewith and a second L-section connected with the first L-section, said second L-section comprising in the series arm thereof a positive reactance and comprising in the shunt arm thereof a non-reactive impedance and a serially connected negative reactance.

13. An electrical network comprising an L-type filter section having in the series arm thereof a single impedance and shunt connected impedances forming a resonant circuit serially connected therewith and having in the shunt arm thereof a single non-reactive impedance and series connected impedances forming a resonant circuit serially connected therewith and a second L-section forming a mirror impedance having in the series arm thereof a single impedance and having in the shunt arm thereof series connected non-reactive and negative reactance impedance elements.

14. An electrical filter network comprising an L-section having in the series arm thereof a single inductive element and a parallelly connected inductive and capacitive element serially connected with the single inductive element and having in the shunt arm thereof a resistive element and a resonant circuit comprising inductance and capacity elements serially connected therewith.

15. The electrical filter circuit claimed in claim 14 comprising in addition an L-type network having a predetermined mirror image impedance.

16. The electrical filter circuit claimed in claim 14 comprising in addition an L-type network having a mirror image impedance, said L-type network mirror image impedance comprising in the series arm thereof a positive reactance and comprising in the shunt arm thereof a serially connected non-reactive impedance element and a negative reactance element.

17. A circuit for supplying electrical energy from a source to a load circuit wherein a rectifier element is used and wherein an L-type filter is connected with the output of the rectifier, said L-type filter including in the series arm thereof an impedance element and a serially connected parallel resonant circuit, and including in the shunt arm thereof an impedance element and a serially connected series resonant circuit, and a load circuit connection across the filter circuit.

18. An electrical circuit for supplying energy from a pulsating unidirectional energy source to a load circuit comprising an L-type filter connected with the energy source, said L-type filter comprising in the series arm thereof a positive reactance and a serially connected parallel resonant circuit and comprising in the shunt arm thereof a non-reactive impedance and a serially connected series resonant circuit, and a second L-type filter connected to the first L-type filter, said second L-type filter comprising in the series arm thereof a positive reactance and comprising in the shunt arm thereof a serially connected non-reactive impedance and a negative reactance.

19. The circuit claimed in claim 17 comprising in addition a resistance element connected between the rectifier output and the L-type filter section.

20. The circuit claimed in claim 18 comprising in addition a resistance element connected between the energy source and the first L-type filter section.

ALAN DOWER BLUMLEIN.